Patented Dec. 12, 1922.

1,438,588

UNITED STATES PATENT OFFICE.

WILLIAM FELDENHEIMER, OF LONDON, ENGLAND, ASSIGNOR OF ONE-HALF TO WALTER WILLIAM PLOWMAN, OF EAST SHEEN, SURREY COUNTY, ENGLAND.

TREATMENT OF CLAY.

No Drawing. Application filed May 5, 1922. Serial No. 558,761.

*To all whom it may concern:*

Be it known that I, WILLIAM FELDEN-HEIMER, a subject of the King of England, residing in London, England, have invented certain new and useful Improvements in the Treatment of Clay, of which the following is a specification.

The present invention is for improvements in and relating to the treatment of clay.

It is known to purify clay by suspending it in a liquid medium by aid of a peptising agent, and after subsidence of any impurities to separate the clay substance, for example, by addition to the suspension of a suitable precipitate, frequently termed a flocculating agent. The peptising or deflocculation reagents hitherto commonly employed will, however, not operate successfully with a number of clays, and in the case of others the difference between the minimum and maximum concentration of the deflocculator which will maintain the clay satisfactorily in suspension is too small for convenient working on the commercial scale.

It has now been found that by the use of the peptising reagent hereinafter described, a number of clays which are not amenable to treatment by the deflocculators hitherto generally utilized, or which demand comparatively close adjustment of the concentration of these reagents, can be successfully treated so as to be maintained sufficiently long in suspension to enable the clay substance to be satisfactorily separated from impurities and recovered on the industrial scale.

According to this invention, a process for the treatment of clay comprising deflocculation of the clay substance in an aqueous medium is characterized by effecting the deflocculation by addition to the clay admixed with water of a pyrogenic derivative of ortho-phosphoric acid, for example, metaphosphoric acid, or an alkali salt of meta- or pyro-phosphoric acid.

The clay may be admixed with a dilute aqueous solution of metaphosphoric acid itself, or of this acid in conjunction with an alkaline peptising agent, such, for example, as sodium carbonate.

Alternatively, the clay may be admixed with a dilute aqueous solution containing the pyrophosphate of an alkaline base, such as, for example, a sodium or potassium pyrophosphate.

The clay may be subsequently recovered from its suspension in any desired manner. When flocculation is adopted for this purpose it may prove advantageous to effect this in the manner described in Patent No. 1,324,958 granted in the United States 16th December, 1919.

The following are descriptions by way of example of the operation of the invention.

Example I.

A Fraddon china clay was worked up with the requisite quantity of soft water to give a 5 per cent mixture, and metaphosphoric acid in the form of an aqueous solution, was added in the proportion of 1 lb. to 1½ lbs. of the acid for every half ton of clay. The mixture was then allowed to stand as a four foot suspension for about four hours. The clay suspension was run off from the residue, and the clay recovered by the addition to the suspension of an aqueous solution of alum, in the proportion of 1 lb. of the salt to each pound of metaphosphoric acid employed for deflocculation.

The flocculation was also effected by addition of sodium bicarbonate, in the proportion 1½ lbs. of the salt for each pound of the metaphosphoric acid previously employed.

Example II.

A Canadian china clay from the St. Remi d'Amherst district of Quebec, a clay which does not lend itself satisfactorily to suspension by treatment with alkaline peptising reagents, such as sodium carbonate, was treated in similar manner as a 5 per cent mixture with soft water, the peptising agent consisting of sodium carbonate and metaphosphoric acid, in the proportion of ½ to 1 lb. of sodium carbonate (as the anhydrous salt) and ½ lb. of the acid to each half ton of clay. The mixture was allowed to stand in the same depth as before for three hours, and the clay was then recovered by addition to its suspension of alum in aqueous solution, ¼ lb. of the salt being used for every ½ lb. of metaphosphoric acid used in the first instance.

Utilizing the same proportion of metaphosphoric acid, i. e. ¼ lb. to each half ton of clay, the quantity of sodium carbonate may be increased to 5 lbs. per each half ton of clay, that is to say, in the case of some clays metaphosphoric acid may operate successfully as a peptising agent in the free state as well as in conjunction with an alkali, but solutions containing salts of the acid with alkaline bases are usually to be preferred by reason of their more general applicability.

It is also preferred to employ the pyro acid in the form of solutions containing its alkali salts, although it is possible that the free acid might effectively bring certain clays into suspension.

*Example III.*

A clay from Wotter, Dartmoor, which could not be brought satisfactorily into suspension by treatment with an alkaline peptising reagent such as sodium hydrate, was worked up with the requisite quantity of water to give a 10 per cent mixture, and sodium pyrophosphate was added in the proportion of 1–1½ lbs. for each ton of clay. The mixture was then allowed to stand as a four foot suspension for about four hours. The clay suspension was drawn off from the residue, and the clay recovered by addition of an aqueous solution of alum, in the proportion of 1 lb. of alum to each pound of the sodium pyrophosphate used for deflocculation.

An equally satisfactory suspension was obtained when the proportion of sodium pyrophosphate was as high as 12 lbs. to each ton of clay.

The same clay was also brought into suspension by treatment with acid sodium pyrophosphate, but the separation of the impurities in this case was not so satisfactory as when the normal salt was employed.

*Example IV.*

1 ton of Canadian d'Amherst clay was mixed with 6–7 tons of water, and 2 lbs. of normal sodium pyrophosphate was incorporated with the mixture. The latter was left to stand for four hours in the form of a four foot suspension, and the supernatant suspension of clay was then drawn off and the clay flocculated by the addition of 2 lbs. of alum in aqueous solution.

An increase in the quantity of the pyrophosphate to 20 lbs. gave an equally satisfactory result.

*Example V.*

1 ton of Fraddon china clay was admixed with 10 tons of water, and to the mixture were added 3 lbs. of acid sodium pyrophosphate in aqueous solution. The mixture was allowed to stand as a two to three foot suspension for from 1½–2 hours. The clay suspension was then drawn off, and the clay precipitated by addition of 3 lbs. of alum dissolved in water.

The above examples are given for illustrative purposes only and not by way of limitation, and it will be appreciated that the composition of the peptising agent employed in any given case will be dependent upon circumstances, such as the nature of the clay to be treated, and both the composition of the reagent and the concentration thereof may be varied according to need, for, as previously indicated, a given peptising agent is not necessarily applicable to all clays, nor is the concentration appropriate for one clay necessarily appropriate for another, and, in fact, it may be said that no particular reagent can be predicted to be a deflocculator for clays in general. A simple preliminary experiment, however, suffices to disclose the behaviour of the clay towards the defloculator, and to determine the composition and the concentration of the latter necessary for effecting deflocculation.

According to the hardness of the water with which the clay is mixed it may be found necessary appropriately to adjust the proportion relatively to the latter of the deflocculator used for preparing the suspension.

I claim:

1. The process for the treatment of clay which comprises effecting deflocculation of the clay substance by mixing the clay with a dilute aqueous solution containing a soluble pyrogenic derivative of orthophosphoric acid.

2. The process for the treatment of clay which comprises effecting deflocculation of the clay substance by mixing the clay with a dilute aqueous solution containing a pyrogenic derivative of an alkali orthophosphate.

3. The process for the treatment of clay which comprises effecting deflocculation of the clay substance by mixing the clay with a dilute aqueous solution containing a pyrogenic derivative of a sodium hydrogen orthophosphate.

4. The process for the treatment of clay which comprises effecting deflocculation of the clay substance by mixing the clay with a dilute aqueous solution containing free alkali and a pyrogenic derivative of a sodium hydrogen orthophosphate.

5. The process for the treatment of clay which comprises effecting deflocculation of the clay substance by mixing the clay with a dilute aqueous solution containing an alkali pyrophosphate.

6. The process for the treatment of clay which comprises effecting deflocculation of the clay substance by mixing the clay with a dilute aqueous solution containing a sodium pyrophosphate.

7. The process for the treatment of clay which comprises effecting deflocculation of the clay substance by mixing the clay with a dilute aqueous solution containing sodium pyrophosphate and an alkali salt.

8. The process for the treatment of clay which comprises effecting deflocculation of the clay substance by mixing the clay with a dilute aqueous solution containing a soluble pyrogenic derivative of orthophosphoric acid, separating the clay suspension from undeflocculated material and recovering the clay from its suspension.

9. The process for the treatment of clay which comprises effecting deflocculation of the clay substance by mixing the clay with a dilute aqueous solution containing a soluble pyrogenic derivative of orthophosphoric acid, separating the clay suspension from undeflocculated material and recovering the clay from its suspension by addition thereto of a flocculating reagent.

In testimony whereof I affix my signature.

WILLIAM FELDENHEIMER.